April 12, 1932.　　　H. E. MILLER　　　1,853,218
INSULATOR MOUNTING
Filed April 28, 1930
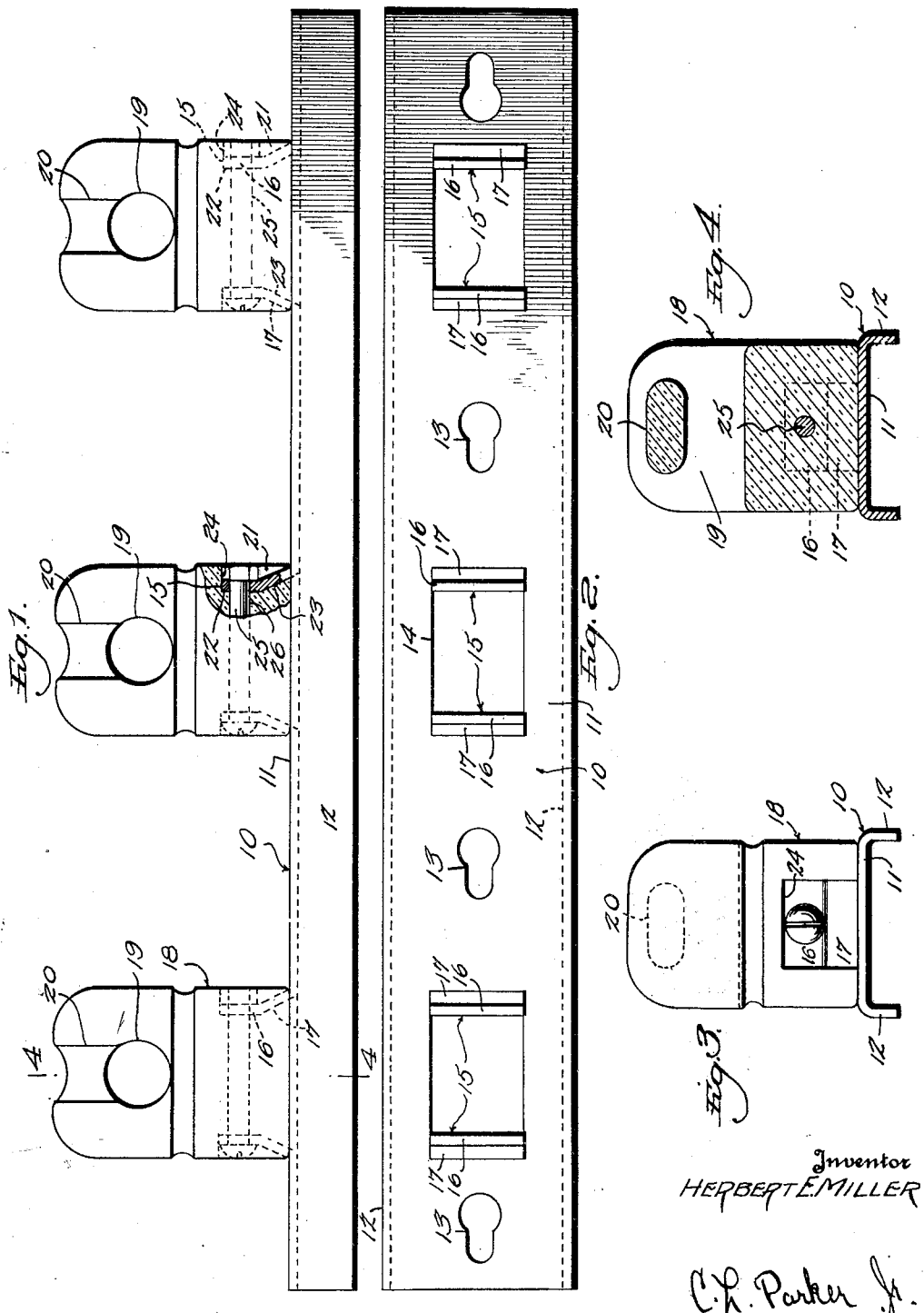

Patented Apr. 12, 1932                                    1,853,218

UNITED STATES PATENT OFFICE

HERBERT E. MILLER, OF ALLENTOWN, PENNSYLVANIA

INSULATOR MOUNTING

Application filed April 28, 1930. Serial No. 448,127.

This invention relates to insulator brackets, and more particularly to a novel form of insulator and a supporting bracket therefor.

An important object of the invention is to provide a novel form of insulator which is adapted to be supported in any desired position by simple and efficient supporting means.

A further object is to provide a novel supporting bracket for insulators.

A further object is to provide an insulator mounting as a whole including a novel coacting insulator, and a simple and efficient supporting bracket therefor which is adapted to provide firm anchorage for the insulator through the provision of a minimum number of simple parts which may be economically manufactured.

A further object is to provide a supporting base having integral elements carried thereby for engagement with a novel form of insulator whereby the latter may be firmly anchored in position on the bracket.

A further object is to provide a novel insulator support as a whole including an insulator and a supporting bracket therefor, which elements cooperate in such a manner as to provide compressive forces for securing the insulator against displacement.

Other objects and advantages of the invention will become apparent during the course of the following description.

In the drawings I have shown one embodiment of the invention. In this showing,

Figure 1 is a side elevation showing the device assembled,

Figure 2 is a plan view of the supporting bracket,

Figure 3 is an end elevation of the assembled device, and,

Figure 4 is a detail section on line 4—4 of Figure 1.

Referring to the drawings, the numeral 10 designates a supporting base or bracket as a whole which is of a substantially inverted U shape in cross section, as shown in Figures 3 and 4. The bracket accordingly includes a relatively broad body 11 having longitudinal flanges 12 at the edges thereof.

The body 11 of the bracket may be provided at spaced points with suitable means for securing it against a desired supporting surface. For example, the bracket is illustrated as being provided with key hole slots 13 for the reception of screws in the usual manner.

One or more insulators may be carried by the bracket, as may be desired, and in the present instance, the bracket is illustrated as being adapted to support three insulators. For this purpose the body of the bracket is provided at spaced intervals with preferably rectangular openings 14 having upstanding lips 15 at the ends thereof, these lips being formed integral with and stamped from the body of the bracket. As shown, the free ends 16 of the lips are arranged parallel to each other and perpendicular to the plane of the body 10, while the lower or inner portions 17 of the lips diverge from each other toward the body of the bracket. The lips are preferably of the shape illustrated in the drawings, the upper or free extremities of the lips being straight and parallel to the plane of the body 10.

The supporting bracket is adapted for use in connection with an insulator of the type illustrated in the drawings. This insulator includes a body 18, which may be mainly cylindrical in cross sectional shape and may be provided at its free end with a coacting opening 19 and groove 20, for the reception of the wire or cable to be carried by the insulator. Each insulator is further provided on opposite sides of the base portion thereof with a recess 21 having inner wall portions 22 and 23 corresponding in shape and angularity to and adapted to contact with the portions 16 and 17 of the corresponding bracket lip 15. The upper face 24 of each recess similarly corresponds in shape and position to the upper extremity of the corresponding supporting lips to be engaged thereby.

A single bolt 25 is adapted to secure each of the insulators in position. This bolt passes through an opening 26 formed in the insulator and through similar alined openings in the ears 15.

The operation of the device is as follows:
Obviously, the portions 16 and 17 of the lips 15 correspond to the faces 22 and 23 of the corresponding insulator recesses 21, the lips 15 normally tending to spring inwardly slightly beyond their operative positions. Accordingly when an insulator is placed in the position illustrated in Figure 1, with the lips 15 snapped into position in the recesses 21, the lips exert an inward pressure thus firmly seating against the inner faces of the recesses. The upper extremities of the lips contact with the upper faces 24 of the recesses, and accordingly it will be apparent that the supporting lips provide firm anchorage for the insulators. A single bolt preferably is employed in connection with each insulator, however, to provide positive means for securing the insulators in position. The application of each bolt, and the tightening of the nut thereof causes the lips to exert an inward pressure against opposite sides of the insulator, and for this reason, it is not essential that the supporting lips tend to spring inwardly beyond their operative positions, as previously stated. It will be apparent however, that with the supporting lips thus exerting an inward pressure the insulators may be employed in some instances without the use of the bolts, depending upon the particular use to which the device is to be put.

With the structure described, it will be apparent that firm anchorage is provided for each insulator in every direction. It is impossible for the insulator to rock on its base in any direction, it is impossible for the insulator to partake of any rotative movement about its axis, and it is impossible to move the insulator out of contact with the supporting arms, particularly when the anchoring bolt is employed. It will be apparent that the device as a whole comprises only three separate parts, namely, the bracket structure, the insulator and the anchoring bolt. The bracket may be stamped from a suitable blank, while the insulator readily may be manufactured in the shape disclosed, to render it adapted for connection with the base. The bolts employed are standard bolts, and accordingly it will be apparent that the device may be cheaply manufactured in large quantities. The device accordingly presents a marked advantage over prior structures for the same purpose in that while it may be more cheaply manufactured, it is far more efficient in operation and the parts may be assembled more readily than is ordinarily the case.

The insulator 18 has been shown merely for the purpose of illustration, and aside from the base structure, including the coacting recesses, any desired type of insulator may be employed. The device tends to eliminate breakage of insulators, but it will be apparent that if such breakage occurs, a broken insulator readily may be removed and a new insulator replaced, such operation merely involving the removal of the bolt, the replacement of the insulator and the insertion of the bolt to operative position.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a support formed of a single piece of material and provided with a pair of spaced integral retaining and supporting fingers projecting from one side thereof, the portions of said fingers adjacent said support diverging from each other toward said support, the portions of said fingers adjacent their free ends being arranged parallel to each other, and an insulator adapted to be arranged against said side of said support and provided with recesses in opposite sides thereof, said recesses having inner faces corresponding in shape and angularity to and engageable with said portions of said fingers.

2. A device of the character described comprising a support formed of a single piece of material and provided with a pair of spaced integral retaining and supporting fingers projecting from one side thereof, the portions of said fingers adjacent said support diverging from each other toward said support, an insulator adapted to be arranged against said side of said support, said insulator being provided with spaced recesses having their inner faces corresponding in shape to and engageable with the inner faces of said fingers, said insulator and said fingers being provided wth alined openings, and a single fastening element passing through said openings.

3. A device of the character described comprising a support formed of a single piece of material and provided with a pair of spaced integral retaining and supporting fingers projecting from one side thereof, the portions of said fingers adjacent said support diverging from each other toward said support, the portions of said fingers adjacent their free ends being arranged parallel to each other, an insulator adapted to be arranged against said side of said support and provided with recesses in opposite sides thereof, said recesses having inner faces corresponding in shape and angularity to and engageable with said portions of said fingers, and a single fastening element passing through said insulator and said fingers.

4. A device of the character described comprising a support formed of a single piece of material and provided with a pair of spaced integral retaining and supporting fingers projecting from one side thereof; the portions of said fingers adjacent said support diverging from each other toward said support, an insulator adapted to be arranged against said side of said support and provided with diametrically opposite recesses having their inner faces corresponding in shape and angularity to and engageable with the inner faces of said fingers, the top and side edges of said fingers being engageable with the top and side walls of said recesses, and a single fastening element passing through said insulator and said fingers.

5. A device of the character described comprising a support formed of a single piece of material and provided with a pair of spaced integral retaining and supporting fingers projecting from one side thereof, the portions of said fingers adjacent said support diverging from each other toward said support, and an insulator adapted to be arranged against said side of said support and provided with diametrically opposite recesses having their inner faces corresponding in shape and angularity to and engageable with the inner faces of said fingers, the top and side edges of said fingers being engageable with the top and side walls of said recesses.

6. An insulator comprising a body having recesses formed in opposite sides and adjacent one end thereof, said recesses having the inner faces of their inner ends parallel to each other and their outer ends diverging toward the adjacent extremity of the body.

7. An insulator comprising a body having diametrically opposite recesses formed in its sides and adjacent one end thereof, said recesses having inner faces the inner ends of which are parallel to each other and the other ends of which diverge toward the adjacent extremity of the body, said body being provided with a bolt receiving opening extending diametrically therethrough and terminating within the inner ends of said recesses.

8. A supporting device for insulators comprising a body of substantial area having spaced lips stamped therefrom wholly within the limits of its area and adapted for arrangement within recesses formed in the sides of the insulator, said lips having their free end portions parallel to each other and their other end portions diverging toward said body.

In testimony whereof I affix my signature.

HERBERT E. MILLER.